(12) United States Patent
Sun

(10) Patent No.: US 8,397,906 B2
(45) Date of Patent: Mar. 19, 2013

(54) IDLER

(75) Inventor: Mingzhao Sun, Beijing (CN)

(73) Assignee: Beijing Yurunhua Science and Technology Co., Ltd., Beijing (CN)

( * ) Notice: Subject to any disclaimer, the term of this patent is extended or adjusted under 35 U.S.C. 154(b) by 0 days.

(21) Appl. No.: 13/139,649

(22) PCT Filed: Dec. 18, 2009

(86) PCT No.: PCT/CN2009/075689
§ 371 (c)(1),
(2), (4) Date: Jun. 14, 2011

(87) PCT Pub. No.: WO2010/094203
PCT Pub. Date: Aug. 26, 2010

(65) Prior Publication Data
US 2011/0253514 A1   Oct. 20, 2011

(30) Foreign Application Priority Data

Feb. 18, 2009   (CN) .......................... 2009 1 0064235

(51) Int. Cl.
*B65G 39/02* (2006.01)
*F16J 15/447* (2006.01)
*F16J 15/453* (2006.01)

(52) U.S. Cl. ........................ 198/842; 384/546; 193/37

(58) Field of Classification Search ................ None
See application file for complete search history.

(56) References Cited

U.S. PATENT DOCUMENTS

| 1,835,823 | A | * | 12/1931 | Taylor ............................ 198/354 |
| 4,040,513 | A | * | 8/1977 | Walls ............................. 198/530 |
| 4,972,939 | A | | 11/1990 | Uttke et al. |
| 6,082,528 | A | * | 7/2000 | Habberley .................... 198/842 |
| 6,287,014 | B1 | * | 9/2001 | Salla ............................. 384/546 |

FOREIGN PATENT DOCUMENTS

| CN | 2259383 Y | 8/1997 |
| CN | 1696548 A | 11/2005 |
| CN | 2739145 Y | 11/2005 |
| CN | 201381108 Y | 1/2010 |
| DE | 10303125 B3 | 11/2004 |

OTHER PUBLICATIONS

PCT Notification of Transmittal of the International Search Report; (Mar. 25, 2010); (PCT/CN2009/075689).

* cited by examiner

*Primary Examiner* — Kavel Singh
(74) *Attorney, Agent, or Firm* — Patton Boggs LLP

(57) ABSTRACT

An idler comprises an idler tube (1), an idler shaft (7), a bearing seat (2) and a labyrinth seal structure at each end of the idler tube (1). The labyrinth seal structure comprises a seal ring (5) and a seal cover (3). A positioning flange (12) is provided on the top edge of the bearing seat (2). A convex ring (4) and a clearer (9) are provided in the seal ring (5). A seal rim (3-1) of the seal cover (3) is fitted between the convex ring (4) and the clean device (9).

9 Claims, 7 Drawing Sheets

IDLER

FIELD OF THE INVENTION

The present invention relates to a manufacturing method and a seal structure for a rotating device, and in particular to a manufacturing method and a seal structure for an idler of a belt conveyor.

BACKGROUND OF THE INVENTION

For an idler bearing seat produced traditionally by means of a method of interference fit, it is necessary to machine stepped holes at both ends of an idler steel tube and then press and fit the bearing seat therein, no matter that the bearing seat is made of cast iron, punched cold-rolled steel sheet or engineering plastic. FIG. 1 shows an idler comprising a bearing seat of cast iron, FIG. 2 shows an idler comprising a bearing seat of punched cold-rolled steel sheet, and FIG. 3 shows an idler comprising a bearing seat of engineering plastic. In FIGS. 1-3, the contact length between the bearing seat and the stepped hole of the idler steel tube is 15-20 mm. FIG. 4 shows an idler produced by welding a punched bearing seat and the idler steel tube. In FIG. 4, the contact length between the punched bearing seat and the stepped hole of the idler steel tube is 2-5 mm (the thickness of the punched sheet steel). Because the idler steel tube itself has certain non-roundness, it is difficult to ensure the concentricity of the stepped holes on both ends of the idler tube during machining. Even if a special tool is employed to fix and machine the stepped holes on both ends of the idler tube in one time, it is also difficult to eliminate the non-roundness of the outer diameter of the tube. At the same time, the production cost will increase. As for producing an idler by the method of welding, since it is prone to generate an error during positioning, and in particular, welding deformation cannot be controlled, it is also difficult to ensure the concentricity of the bearing seats on both ends of the idler tube, which makes an amplitude of a fluctuation curve of the rotation resistance of the idler very great. An idler has been disclosed that is produced by the interference fit between a bearing seat of engineering plastic and an idler tube without stepped holes at both ends thereof. Although this method can ensure the concentricity of the bearing seats on both ends of the idler tube and eliminate most of the non-roundness of the tube, the wall thickness of the idler steel tube is small (1.5-3.5 mm), which can meet only light load applications. So this method is unsuitable for producing an idler capable of bearing medium- or heavy-load by using a thick-walled steel tube, and cannot meet the usage requirements in many situations.

Additionally, for the seals on both ends of the prior art idlers, different forms of labyrinth structures are employed mostly. However, whatever labyrinth seal is used, it cannot attain the object of well preventing trickling water, dust and mud from contaminating the idler bearing, resulting in premature failure of many idlers, the normal operation of a belt conveyor being influenced, a greater drive power being required, and a waste of the energy source and a serious wear of the rubber belt. For some other idlers employing a contact-type seal, the rotation resistance of the idler with such contact-type seal is large. Moreover, if the trickling water is combined with the wear of impurities such as coal dust and silt, the working period will also be very short.

SUMMARY OF THE INVENTION

It is an object of the present invention to provide an idler, wherein, after the bearing seats are fitted on both ends of the idler, the concentricity is high, the excircle radial runout is small, the rotation resistance is small, and various trickling water, dust, silt or even immersion water hardly contaminates the bearing of the idler.

The technical solution of the invention is an idler comprising: an idler tube, an idler shaft, a bearing seat, a seal ring with a convex ring and a clearer, and a seal cover. The seal rim of the seal cover is fitted between the convex ring and the clearer; the thickness b of the convex ring is 0.1-3 mm, the height f of the convex ring is 2-50 mm, the gap c between the outer circumference of the convex ring and the seal rim of the seal cover is 0.2-2 mm, the distance d between the upside of the convex ring and the bottom of the seal cover is 2-50 mm. The length a by which the underside of the seal rim exceeds the underside of the convex ring is greater than 0.3 mm. No matter the bearing seat is made of engineering plastic, punched sheet steel, cast iron, aluminum alloy or carbon steel, the top edge of the bearing seat has a flange for positioning. At either end of the idler tube, no stepped hole needs to be machined, and thus only an end face and an inner chamfer are machined, and the bearing seat is directly pressed into position at both ends of the idler tube by means of interference fit, thus effectively ensuring the coaxiality of the bearing seats at both ends. Then, the idler shaft, the seal ring and the seal cover are fitted in sequence. By configuring the small gap formed between the outer circumference of the convex ring and the inner wall surface of the seal rim of the seal cover as an outermost barrier, and by means of a labyrinth seal structure in which the convex ring has a small thickness and a big height and a cavity to which the upside of the convex ring immediately adjacent is large, the universal gravitation generated between the labyrinth seal ring and seal cover during the rotation of the idler can be reduced to the greatest extent, so that the object of delaying or even interrupting the extending of contaminants can be attained, ensuring a normal work lifetime of the bearing in the idler, thereby greatly prolonging the work lifetime of the idler.

The invention has the following advantages:

1. Traditional plastic idlers are all produced by extruding and cutting a plastic tube. Because the dimensional precisions of the inner diameters are decentralized and distinguished greatly and cannot meet the fitting requirements, it is necessary to perform the fitting operation after stepped holes are machined at both ends of the tube. However, the present invention uses a plastic tube produced by an injection process or a high-frequency welded steel tube, which has a good linearity and a good consistency on the dimensional precision of the inner and outer diameters so that the inner diameter can fully meet the fitting requirements without being further machined. By taking the inner diameters of both ends of the tube as a reference, the bearing seats are pressed into both ends of the idler tube by means of interference fit, so that the coaxiality of the bearing seats at both ends of the idler tube can meet the precision requirements when the bearing is in use, and the consistency on fitting precision can be ensured, thus the rotation resistance of the idler will be about twice lower than that of the traditional idler, and the normal work lifetime of the bearing will be guaranteed, wherein the amount of interference fit is 0.1-0.3 mm in case of a bearing seat of engineering plastic and a plastic injection molding tube, with which the idler can only meet a light-load application; and the amount of interference fit is 0.2-0.7 mm in case of a metallic bearing seat and a steel tube, with which the idler can meet a medium- or a heavy-load application.

2. When the bearing seat is pressed into both ends of the idler tube or the plastic tube by means of interference fit, the non-roundness that exists originally is rounded by 60-70%, so that the excircle radial runout of the idler is reduced greatly.

The effect of eliminating the non-roundness of the steel tube and ensuring the concentricity of the bearing seats at both ends is obtained with the interference fit technology for a plastic bearing seat and an idler steel tube that has been disclosed by utilizing the good plasticity of the engineering plastic and the characteristic of thin wall of the idler steel tube. After the interference fit, the idler tube is expanded and rounded a little, and the plastic bearing seat is compressed and deformed largely, the idler can thus meet the national standard but its bearing capacity is limited. After the interference fit of the metallic bearing seat and the thick-walled steel tube of the idler is performed, the deformation amount of the tube is 60-70%, the diameter of the tube at which the bearing seat is fitted is apparently expanded by about 0.6 mm, and the bearing capacity thereof is increased by one to five times in comparison with those obtained by the above-mentioned method of interference fit, the method of interference fit with stepped holes machined at both ends and the method of welding and fitting a punched sheet steel bearing seat described above. This large interference fit is recognized as an "unreasonable" method and process in traditional machining, because it makes the outer diameter of the tube changed greatly after fitting. However, after a long time of research, the applicant finds that it is by this "unreasonable" method and process that many performance indexes of the idler can be greatly improved: reducing the excircle radial runout and the rotation resistance, increasing the bearing capacity, which can not only ensure the smooth operation of the rubber belt, but also effect energy saving and consumption lowering to some extent.

3. It is omitted that the machining procedure of machining stepped holes and welding bearing seats at both ends of the idler tube in the prior art, thus the production process is simplified, the energy sources and the raw materials are saved, the labor intensity and the production cost are lowered, and in particular, the nonaxiality of the bearing seats locations at both ends caused by welding deformation and machining error is avoided.

4. After the seal ring with a convex ring is fitted with the seal cover, an effective labyrinth seal structure is formed between the outermost ring surface of the convex ring and the inner wall surface of the seal rim of the seal cover. The width of the adjacent surfaces between the convex ring and the inner wall surface of the seal rim of the seal cover is very small (the thickness of the convex ring of 0.1-3 mm), the universal gravitation generated during the rotation is also very small, and the speed at which water and dust extends into the labyrinth seal structure by the universal gravitation is very small. Additionally, the universal gravitation generated during the rotation of the seal ring only exists at the two very small adjacent surfaces between the convex ring and the inner wall of the seal rim of the seal cover, and the adjacent surfaces are far away from the bottom of the seal cover and the root portion of the convex ring, so that the universal gravitation generated is naturally interrupted here and cannot be continued. Even if the contaminants such as water and dust can extend through the convex ring by the universal gravitation, they will naturally stop and not extend forward. Therefore, the labyrinth seal structure of the invention can effectively prevent from contaminating the idler bearing.

5. The length of the receiving-force point of the bearing with respect to the idler tube is shortened, and the bearing capacity of the bearing seat is improved, thus allowing the thickness of the bearing seat material to be reduced relatively and thereby a large amount of raw materials to be saved. The following defects can be overcome that the distance of the receiving-force point of the traditional idler bearing with respect to the tube is large, the moment arm is long (illustrated as e in FIG. 2 for example) and the intensity is poor.

6. Because the gap between the convex ring and the inner wall of the seal rim of the seal cover remains constant and it does not change in the case of the axial play, the play amount does not influence the sealing effect, thereby facilitating greatly fitting.

7. When the idler is rotated, the clearer serves to clear the contaminants of semi-fluidity (for example, coal silt and wet slag) that fall onto the end face of the idler at any moment, thus avoiding that the contaminants are stacked on the end face of the idler and extend into the labyrinth seal after forming an altitude difference.

8. The rotation resistance of the idler is small, the bearing is not contaminated the rotation flexibility is not changed, the wear speed of the wall of the idler tube is small, so that not only the work lifetime of the idler can be increased by more than 10 times, but also the wear of the rubber belt can be decreased by several times, thereby leading the maintenance cost to be avoided, the noise contamination to be eliminated, failures and accident potentials to be decreased, and the safety performance to be improved, and allowing the effect of energy saving and consumption lowering of the whole idler to reach about 50%.

BRIEF DESCRIPTION OF THE DRAWINGS

FIG. 5 is a structural schematic view of an idler tube;

DETAILED DESCRIPTION OF THE EMBODIMENTS

Thereafter, the present invention will be further illustrated in conjunction with the drawings and embodiments thereof.

Figure 1:
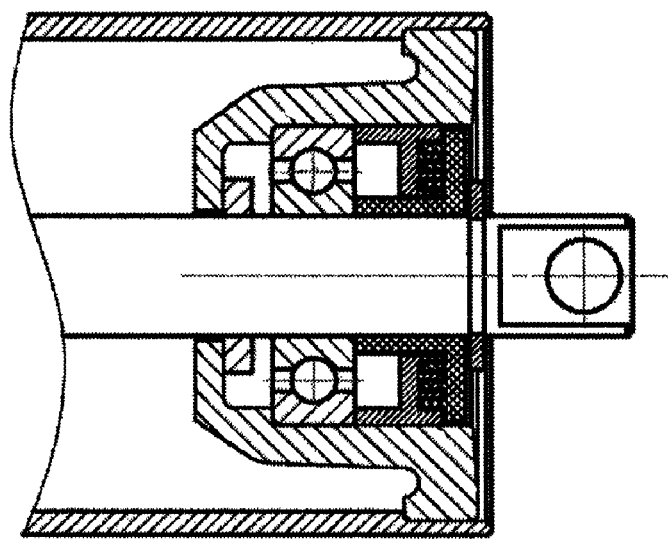
FIG. 1 is a structural view of a bearing seat of cast iron and a fitted idler in the prior art.
Figure 2:
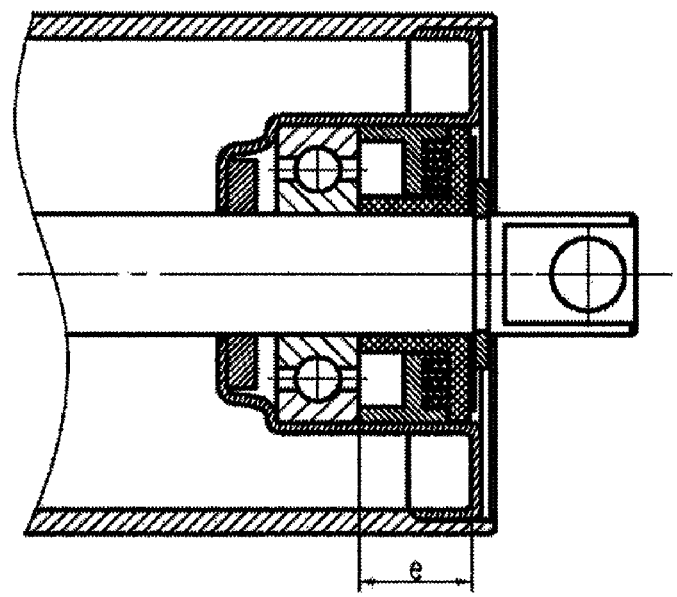
FIG. 2 is a structural view of a punched bearing seat and a fitted idler in the prior art.
Figure 3:
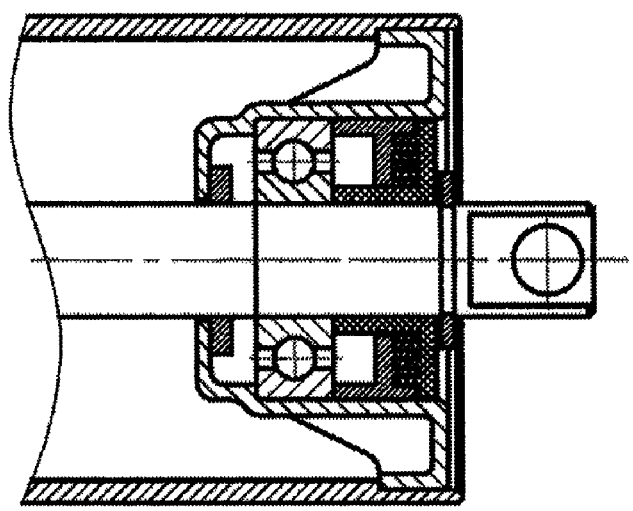
FIG. 3 is a structural view of a bearing seat of engineering plastic and a fitted idler in the prior art.
Figure 4:
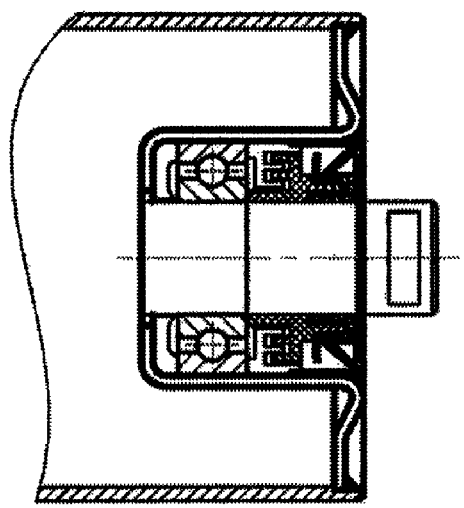
FIG. 4 is a structural view of a punched bearing seat and a fitted idler by welding in the prior art.
Figure 6:
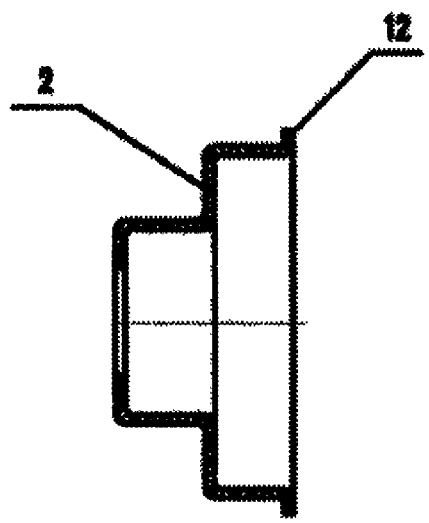
FIG. 6 is a structural schematic view of a bearing seat of punched cold-rolled steel sheet.
Figure 7:
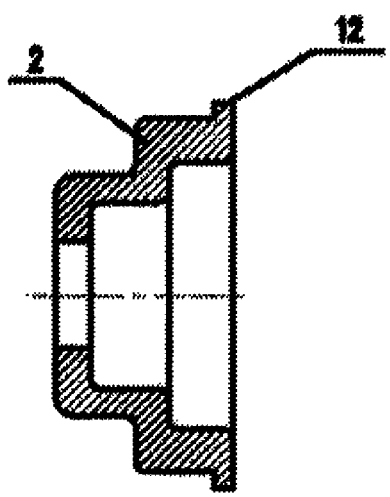
FIG. 7 is a structural schematic view of a bearing seat of cast iron, aluminum alloy or carbon steel.
Figure 8:
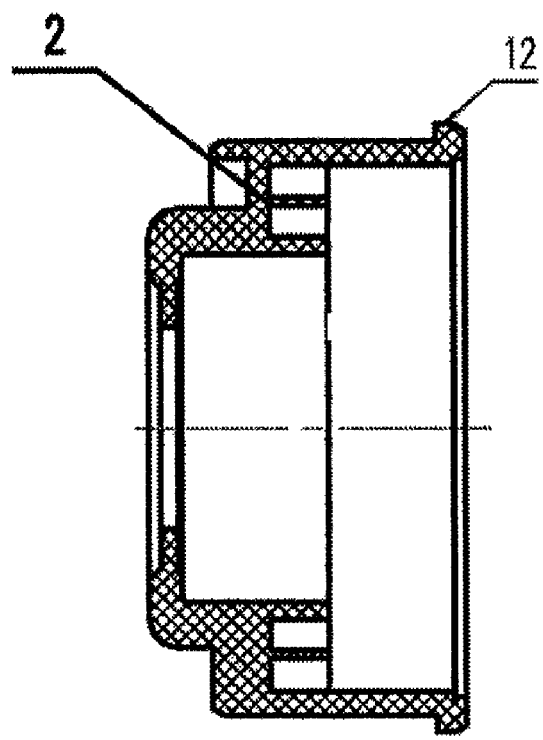
FIG. 8 is a structural schematic view of a bearing seat of engineering plastic.
Figure 9:
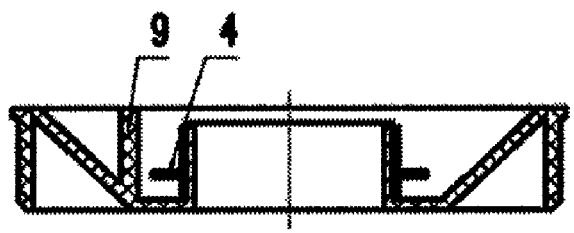
FIG. 9 is a structural schematic view of a seal ring with a convex ring fastened thereon and a clearer.
Figure 10:
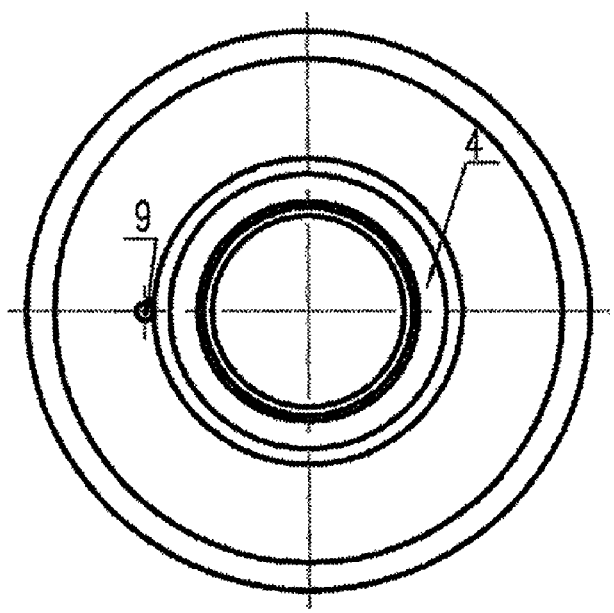
FIG. 10 is a structural top view of a seal ring with a convex ring fastened thereon and a clearer.
Figure 11:
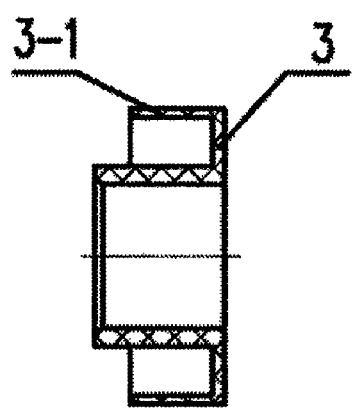
FIG. 11 is a structural schematic view of a seal cover.
Figure 12:
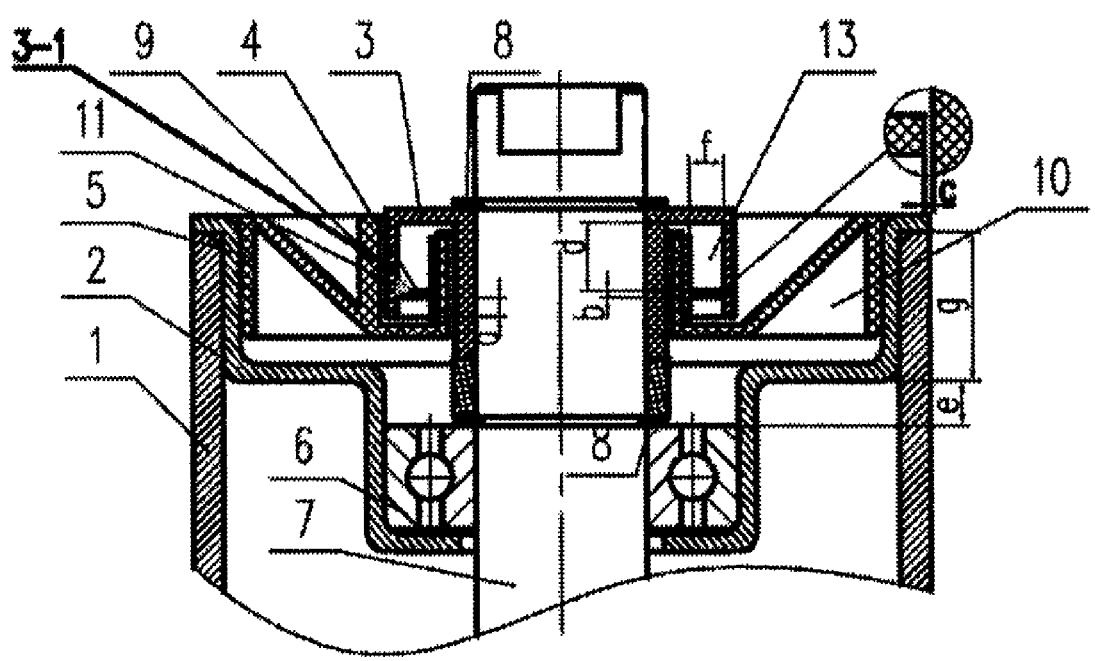
FIG. 12 is a view showing the fitting structure of an idler.
Figure 13:
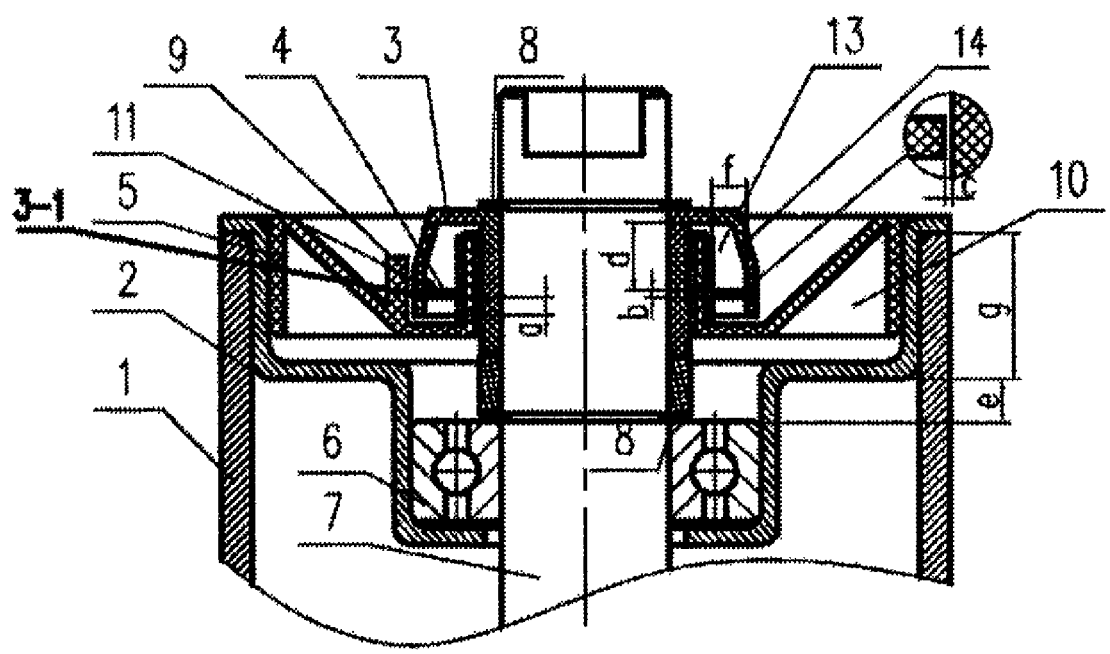
FIG. 13 is a view showing the fitting structure of an idler with a sloped seal cover.

FIG. 5 shows an idler tube (a steel tube or a plastic tube), wherein only an end face and an inner chamfer at both ends of the idler tube need to be machined; FIG. 6 is a bearing seat of punched cold-rolled steel sheet; FIG. 7 is a bearing seat of cast iron, aluminum alloy or carbon steel; and FIG. 8 is a bearing seat of engineering plastic. In the bearing seats made of various materials, a flange 12 is provided which is positioned to the end face of the idler tube. FIG. 9 and FIG. 10 are structural views of a seal ring with a convex ring 4 fastened thereon and a clearer 9; FIG. 11 is a structural view of a seal cover; FIG. 12 is a view showing the fitting structure of an idler, and FIG. 13 is a view showing the fitting structure of an idler with a sloped seal cover. In FIG. 12 and FIG. 13, reference number 1 designates an idler tube, 2 designates a bearing seat. After the bearing seat 2 is coated with a sealant, it is pressed into position by means of interference fit at each end of the idler tube 1 with the flange 12 abutting against the end face of the idler tube 1. Then, after an idler shaft 7, a bearing 6 and a retainer ring 8 are fitted into the bearing seat 2 in sequence, a seal ring 5 with a convex ring 4 and a convex clearer 9 is coated with a sealant and also fitted into the corresponding hole of the bearing seat 2 by means of interference fit. And then a seal cover 3 is mounted onto the idler shaft 7 by means of interference fit, and last stopped by a retainer ring 8.

Since both a high-frequency welded steel tube dedicated for an idler and a injection-molded plastic idler tube have a good linearity and a good uniformity of a circumferential wall thickness, after the bearing seat is pressed into the idler steel tube or the idler plastic tube with a large interference, except that most of the non-roundness of the tube is eliminated forcibly and the diameter of the bearing seat becomes reduced under pressure, no factor that causes a disalignment deformation generates; and the reduced extent of the diameter of the bearing seat under pressure is so small that it does not influence the size of the bearing chamber accommodating the bearing therein. Thereby, the concentricity of the bearing seats on both ends of the idler tube and the flexibility of the bearing can both be reliably ensured. Moreover, the contact length between the bearing seat and the idler tube is about 20 mm illustrated as g in FIG. 12 and FIG. 13. Therefore, as long as the bearing seat is pressed into position, the bearing capacity of the idler can be met.

In FIG. 12 and FIG. 13, after the seal ring 5 with the convex ring 4 is fitted, a large space 10 is defined between the bearing seat 2 and the M-shaped seal ring 5, which serves as a storage compartment capable of accommodating a lot of contaminants. In case the contaminants enter the seal ring, the storage compartment can serve to accommodate the contaminants, thus the preceding time before the bearing is finally subjected to contamination is prolonged.

The column-shaped clearer 9 protruding from the seal ring is integrated with the seal ring 5. When the column-shaped clearer 9 is rotated, it can clear various contaminants of semi-fluidity such as coal silt and the like that fall on the end face of the idler at any moment, thus preventing the contaminants from stacking on the end face of the idler and creating an altitude difference thereon which otherwise will results in pressure formation and the contaminants extending into the seal ring and contaminating the bearing.

In FIG. 12 and FIG. 13, the convex ring 4 is fastened together with the seal ring 5, which can be achieved by two bodies fastened and connected together or one-piece integrated. A seal rim 3-1 of the seal cover is fitted between the convex ring and the clearer. The smaller the thickness b of the convex ring is, the better the effect will be. In case of a metallic material, the thickness can be less than 0.5 mm; in case of a plastic piece, the thickness can be less than 3 mm, preferably about 1 mm. The height f of the convex ring is greater than 2 mm, preferably 4-8 mm, and if situations permit, the higher the height is, the better the effect will be. If the height f of the convex ring is less than 3 mm, a certain universal gravitation can be generated when the convex ring is rotating, resulting in degrading the sealing effect; when the height is less than 2 mm, the sealing effect will degrade further; and when the height is less than 1 mm, the universal gravitation generated will attract the contaminants into the labyrinth seal structure continuously. The smaller the gap c between the convex ring and the seal cover is, the better the effect will be, with the minimum value of the gap being 0.2 mm and the maximum value being 2 mm, and the value of the gap preferably being 0.2-0.5 mm. After the seal cover 3 is fitted, the length of the seal rim 3-1 must cover or exceed the underside of the convex ring 4 beyond 0.3 mm or more (illustrated as a in FIG. 12 and FIG. 13). If the seal rim of the seal cover cannot cover the underside of the convex ring, the following contaminants will apply a continuous pushing force to the preceding ones, so that the contaminants will extend into the labyrinth seal continuously. Additionally, the length a beyond the convex ring will not change the designed gap, and will not influence the sealing effect. Therefore, it is very convenient for fitting, and the seal reliability can be ensured. The distance between the upside of the convex ring 4 and the bottom of the seal cover (illustrated as d in FIG. 12 and FIG. 13) has a minimum value of 2 mm, and is preferably 5-10 mm, and if situations permit, the larger the distance is, the better the effect will be. If the distance between the upside of the convex ring and the bottom of the seal cover is less than 2 mm, when the convex ring is rotating, a certain universal gravitation will be generated in the gap, thus resulting in degrading the sealing effect. If the distance between the upside of the convex ring and the bottom of the seal cover is less than 1 mm, water and dust will have no "hesitation" in extending into the labyrinth seal continuously, no matter whether lubricating grease is filled in the gap and how much the lubricating grease is filled.

After the seal rim of the seal cover 3 covers the convex ring 4, when the convex ring 4 is rotated along with the seal ring 5, the relative movement area between the circumference of the convex ring and the inner wall of the seal rim 3-1 of the seal cover 3 is very small, thus the universal gravitation generated is very small. Moreover, because the distance d between the convex ring 4 and the bottom of the seal cover is large, and the height f of the convex ring 4, that is, the distance f between the root portion (i.e., the inner side) of the convex ring 4 and the inner wall of the seal rim 3-1 is also large, the universal gravitation will be interrupted. After the contaminants extend through the adjacent surfaces of the convex ring 4 and the inner wall of the seal rim 3-1 of the seal cover 3, they will stop extending as the universal gravitation is interrupted.

The distance e (the moment arm) from the bearing to the steel tube supported by the bearing seat is small, thus increasing the receiving-force strength of the bearing seat.

FIG. 13 is a view showing the fitting structure of an idler with a sloped seal cover. In FIG. 13, the upper part of the seal cover 3 is shaped into a slope 14, as shown by reference number 14 in FIG. 13. Thus, when the idler is horizontally mounted, once water enters the idler, the water will flow back and no longer extend forward when it meets the slope.

Patent document FR2175477A discloses a seal with a convex circle member. The main object of this technical solution is to prevent contaminants from entering the seal structure when the idler is in static state. However, the convex circle member has a large thickness and a small height, the adjacent surfaces between the convex circle member and the seal cover are large, the distance between the convex circle member and the bottom of the seal cover is small, and the seal cover does not cover the outer side of the convex circle member either. When the convex circle member is rotated, a universal gravitation can be generated between the convex circle member and the inner wall of the seal cover as well as between the convex circle member and the side of the seal cover, so that water or dust is attracted and extend into the labyrinth seal structure, and then contaminates the bearing. The structure and the operating principle thereof are essentially distinguished from those of the present invention.

A direction-variable seal (convex ring) structure is also disclosed, for example in U.S. Pat. No. 4,972,939A, wherein an elastic direction-variable (convex ring) seal is provided inside the labyrinth seal, and the labyrinth seal is again changed into a contact-type seal structure with a slight friction. However, in such a structure, not only the rotation resistance of the idler is increased, but also the effect is very poor. The reason lies in that, if the contaminants having entered the seal cannot be discharged, the seal will be soon filled up and jammed, resulting in the idler unable to be rotated. Thus, a great defect exists in such a structure.

As is well known, the larger the gap of the labyrinth seal is, the poorer the sealing effect will be. Therefore, it is a conventional choice for the person skilled in the art that the gap of the labyrinth seal is shortened and the distance of the labyrinth is prolonged (increased) as possible as one can, in order to obtain a good sealing effect. And it is widely thought that the smaller the gap is and the longer (more) the labyrinth is, the better the sealing effect will be. However, it is a big misunderstanding on the labyrinth sealing principle. It has been proved by the applicant after many tests that, the smaller the gap of the labyrinth seal is and the longer the labyrinth lasts, the larger the universal gravitation generated during rotation will be and the larger the extending speed of the contaminants will be. So long as the contaminants pass through the first stage of the labyrinth and the universal gravitation is not interrupted, the contaminants will keep extending very fast, no matter how long the labyrinth seal is. Therefore, for those labyrinth seals designed by the method of changing the outermost location, size, length, structure or shape of the seal gap, the speeds at which the contaminants enter or extend into the idler as well as the time that the contaminants take before finally contaminating the bearing are distinguished but not ideal. Moreover, many methods of prolonging the time that the contaminants take before finally contaminating the bearing employ a large amount of lubricating grease filled in the structure of a small seal gap and a long labyrinth, thus compromising the rotation resistance of the idler which is greatly increased. In other words, the general sealing effect of the labyrinth seal with a small gap is not much better than that of the labyrinth seal with a large gap. Therefore, in the present invention, the applicant on one hand adopts a labyrinth sealing method of configuring the small gap formed between the outer circumference of the convex ring 4 and the inner wall surface of the seal rim 3-1 of the seal cover as an outermost (the first stage) barrier, and on the other hand employs a labyrinth seal structure in which the adjacent surfaces between the inner wall of the seal rim 3-1 of the seal cover and the outer circumference of the convex ring 4 is small (the thickness b as illustrated in FIG. 12 and FIG. 13 is small), the distance between the seal rim 3-1 of the seal cover and the root portion of the convex ring is large (the height off is large), and the cavity to which the upside of the convex ring immediately adjacent is large (illustrated as the reference number 13 in FIG. 12 and FIG. 13, wherein the size of said large cavity depends on two dimensions, i.e. the distance d between the upside of the convex ring 4 and the bottom of the seal cover and the height f of the convex ring, and generally the distance d and the height f are both larger than 2 mm, and preferably the distance d is 5-10 mm and the height f is 4-8 mm, moreover, the larger the distance d and the height f are, the better the effect will be). In this way, the universal gravitation generated during the rotation of the convex ring 4 will be minimum, in which the smaller the thickness b in FIG. 12 and FIG. 13 is and the larger the height f and the distance d are, the smaller the universal gravitation generated during the rotation of the convex ring will be, thus the better the sealing effect will be. Thereby, the contaminants are naturally interrupted before they reach the large cavity, and the ideal sealing effect can be obtained that the idler bearing will not be contaminated because the contaminants extend very slowly and stop extending after the universal gravitation is interrupted. In conclusion, it is to be noted that, the labyrinth seal must enable the universal gravitation to be interrupted at the outermost sealing place (that is, the outer circumferential surface of the convex ring 4), thereby to make the contaminants stop extending. Otherwise, once the contaminants have entered from the outermost seal, they can never withdraw. At this point, it is no use of blocking or other arrangement. Also under such circumstances, either the seal is filled up with and jammed by the contaminants or the bearing is jammed by the contaminants, even if more or less lubricating grease is filled in the seal gap. This is a common defect of the traditional labyrinth seal. It is the first principle discovery since the application of the labyrinth seal that the method of interrupting the universal gravitation is carried out by making the outermost small gap block adjacent to the large cavity so as to enable contaminants to stop extending at the outermost labyrinth seal. This labyrinth seal structure described above is not limited to apply to the idler structure according to the present invention, but also it may be applicable for other rotating devices with similar structures. In case of a rotating device with a large diameter, the sizes of a, b, d and f in the seal structure all need to be magnified.

As shown in FIG. 12 and FIG. 13, it is well known that lubricating grease is coated at the inner wall surface of the seal rim of the seal cover 3 which is adjacent to the convex ring 4 in order to fill the gap between the adjacent surfaces of the convex ring and the seal rim of the seal cover. This is because the lubricating grease itself due to its viscosity can form a "barrier wall" 11 in order to block the contaminants from entering the seal structure. The applicant has found by testing that the amount of lubricating grease filled in the seal has a great influence on the rotation resistance of the idler. For the contaminants of trickling water and dust, the seal structure can obtain a very good blocking effect by coating a small amount of lubricating grease at the adjacent surfaces between the convex ring 4 and the seal rim 3-1 of the seal cover 3. Because the upside of the convex ring 4 is in close proximity to the large cavity 13, only the lubricating grease closer to the convex ring 4 moves along with the rotating of the convex ring, whereas the remote lubricating grease remains in static state. Thus, most of the shape of the "barrier wall" 11 can keeps unchanged, which can have a good barrier effect against the trickling water and dust that are attracted by a decreased universal gravitation and have a weaker extending tendency. Additionally, when the trickling water or the dust passes through the adjacent surfaces between the convex ring 4 and the seal rim 3-1 of the seal cover 3, they will stop extending forward and be in static state due to the interruption of the universal gravitation and the blocking action of the "barrier wall" 11. Therefore, another prominent characteristic of the "barrier wall" 11 in the large cavity 13 is that, because the "barrier wall" 11 has a small contact area with the convex ring 4, which generates a very small adhesion resistance during the rotation of the convex ring, it has a very small influence on the rotation resistance of the idle. For the idler produced by utilizing said labyrinth seal structure and the above bearing seats with high-concentricity on both ends of the idler tube, the rotation resistance is tested to be 0.65

N-1.35 N (in the current China and international standards on the idler, the reference scope of rotation resistance is 2.5 N-3.5 N), and the bearing can remain under a good lubrication all the time. The work lifetime of the bearings in the idler can reach about 150,000 hours on average (the work lifetime will be different under different loads). Further, if the wear resistance, the corrosion resistance and the rust resistance of the idler tube can be guaranteed, the name of "wearing part" for the traditional idler can thus be discarded in case of application of the present invention in various contaminated environments. Moreover, the rubber belt wear, the energy source consumption, the maintenance cost, the noise contamination, the roller wear and various accident potentials of the belt conveyor can be reduced greatly, thus leading the general economic benefit and the social benefit improving significantly.

When the idler is required to be used in the water, the large cavity 13 between the convex ring 4 and the bottom of the seal cover 3 can be filled up with lubricating grease. Because most of the lubricating grease is far away from the convex ring 4, those lubricating grease can remain in static state when the convex ring is rotated, thus enable blocking water well. As a result, under a small pressure, the speed at which water enters the seal is small, and almost zero. After testing, it is found that, when the large cavity is filled up with the lubricating grease, the rotation resistance of the idler will not exceed 1.5 N.

Although only one end of the idler has been illustrated and described with reference to the drawings showing the fitting structure of the idler, the illustration and description of the other end of the idler is the same as the one end thereof.

What is claimed is:

1. An idler comprising: an idler tube (1), an idler shaft (7), a bearing seat (2) and a labyrinth seal structure at each end of the idler tube, in which the labyrinth seal structure comprises a seal ring (5) and a seal cover (3), wherein
    a flange (12) for positioning is provided on the top edge of the bearing seat, and the bearing seat is pressed into both ends of the idler tube (1) by means of interference fit after the bearing seat is coated with a sealant;
    a convex ring (4) and a clearer (9) are provided in the seal ring;
    a seal rim (3-1) of the seal cover is fitted between the convex ring and the clearer; and
    the thickness (b) of the convex ring is 0.1-3 mm, the height (f) of the convex ring is 2-50 mm, the gap (c) between the outer circumference of the convex ring and the seal rim (3-1) of the seal cover is 0.2-2 mm, and the distance (d) between the upside of the convex ring and the bottom of the seal cover is 2-50 mm,
    wherein the seal ring in the form of M shape is mounted onto the bearing seat by means of interference fit, and a storage compartment (10) is formed between the seal ring and a corresponding surface of the bearing seat; and
    wherein lubricating grease (11) is coated at the adjacent surfaces between the convex ring of the seal ring and the seal rim (3-1) of the seal cover, and the seal cover (3) is mounted onto the idler shaft (7) by means of interference fit.

2. The idler according to claim 1, wherein after the seal cover is fitted, the length (a) by which the underside of the seal rim (3-1) exceeds the underside of the convex ring (4) is greater than 0.3 mm.

3. The idler according to claim 1, wherein the bearing seat is made of engineering plastic, the idler tube is a plastic injection-molded tube, and the amount of interference fit is 0.1-0.3 mm.

4. The idler according to claim 1, wherein the bearing seat is made of punched steel sheet, cast iron, aluminum alloy or carbon steel, the idler tube is a high-frequency welded steel tube, and the amount of interference fit is 0.2-0.7 mm.

5. The idler according to claim 1, wherein only an end face and an inner chamfer are required to be machined on both ends of the idler tube (1).

6. The idler according to claim 5, wherein the upper part of the seal rim (3-1) of the seal cover is in the form of a slope (14).

7. The idler according to claim 1, wherein during fitting, a sealant is coated on the contact surfaces between the metallic bearing seat and the idler steel tube, and a sealant is also coated on the contact surfaces between the seal ring and the bearing seat.

8. The idler according to claim 1, wherein the convex ring (4) and the seal ring (5) are formed by means of two bodies fastened and connected together or one-piece integrated.

9. The idler of claim 1, wherein the M shape includes a first and second acute angle piece formed on both sides of an aperture configured to receive the idler shaft.

* * * * *